(12) United States Patent
Hoshina et al.

(10) Patent No.: US 6,288,802 B1
(45) Date of Patent: Sep. 11, 2001

(54) IMAGE SCANNER

(75) Inventors: Masami Hoshina, Yamagata; Shintaro Komuro, Tokyo, both of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/160,797

(22) Filed: Sep. 25, 1998

(30) Foreign Application Priority Data

Sep. 26, 1997 (JP) .................................................. 9-262100

(51) Int. Cl.$^7$ ...................................................... H04N 1/04
(52) U.S. Cl. ................... 358/488; 358/474; 358/500; 358/400; 382/313; 382/314
(58) Field of Search .................... 358/488, 474, 358/500, 400, 505; 382/313, 314

(56) References Cited

U.S. PATENT DOCUMENTS

| | | | |
|---|---|---|---|
| 5,086,228 | 2/1992 | Kojima | 250/327.2 |
| 5,663,558 | 9/1997 | Sakai | 250/234 |
| 5,852,686 | * 12/1998 | Kubo | 382/313 |
| 6,049,406 | * 4/2000 | Zocca | 359/196 |

FOREIGN PATENT DOCUMENTS

| | | |
|---|---|---|
| 61-9074 | 1/1986 | (JP) . |
| 61-229174 | 10/1986 | (JP) . |
| 63-187462 | 11/1988 | (JP) . |
| 63-284964 | 11/1988 | (JP) . |
| 64-48120 | 2/1989 | (JP) . |
| 3-150521 | 6/1991 | (JP) . |
| 3-154475 | 7/1991 | (JP) . |
| 3-155267 | 7/1991 | (JP) . |
| 3-198039 | 8/1991 | (JP) . |
| 4-167861 | 6/1992 | (JP) . |
| 5-7280 | 1/1993 | (JP) . |
| 5-40843 | 2/1993 | (JP) . |
| 6-291946 | 10/1994 | (JP) . |
| 8-21970 | 1/1996 | (JP) . |
| 9-224121 | 8/1997 | (JP) . |

* cited by examiner

Primary Examiner—Jerome Grant, II
Assistant Examiner—Negussie Worku
(74) Attorney, Agent, or Firm—Foley & Lardner

(57) ABSTRACT

An image scanner capable of detecting the center of a valid image reading range is disclosed. To accurately detect the center position of a mirror, a center mark is positioned outside of the valid image reading range in parallel to the axis of rotation of the mirror. The center mark is input together with an image.

3 Claims, 4 Drawing Sheets

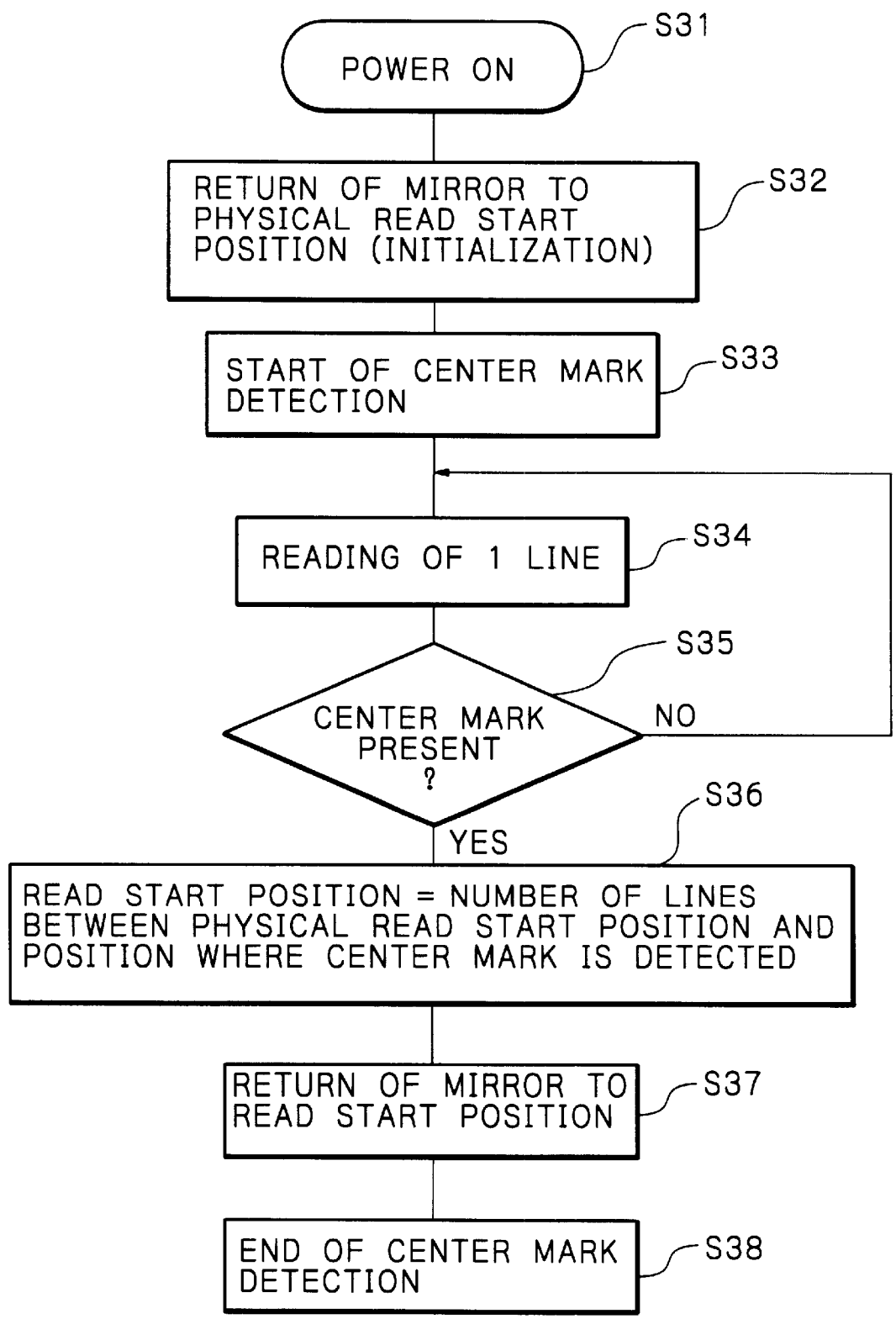

IMAGE SCANNER

BACKGROUND OF THE INVENTION

The present invention relates to an image scanner and, more particularly, to an image scanner capable of detecting the center of a valid image reading range.

Today, an image scanner is extensively used to read an image and input it to, e.g., a personal computer. The image scanner usually includes a rotatable mirror and a linear CCD (Charge Coupled Device) image sensor. One line of image in the main scanning direction reflected in the mirror is incident to the linear CCD image sensor. A bidimensional image is read by the scanner with the mirror sequentially rotated in the subscanning direction. Assume that when the mirror is held at an angle of 45°, a distance at which an image positioned at an angle of 90°, as seen from the image sensor, is incident to the image sensor is the center position of the mirror. Then, when the angle of the mirror is changed, the distance of the image incident to the image sensor is farther than when the mirror is held at the 45° position. As a result, the image is sequentially reduced in size in the main scanning direction as the mirror is moved away from the 45° position. This causes the bidimensional image picked up by the image scanner to distort in a barrel configuration. To correct such distortion, it is necessary to detect the center of an image, i.e. a position where the mirror reaches its 45° position, and then enlarge the image reduced in the main scanning direction to its original position in accordance with the distance from the above position. The prerequisite is therefore that the center of an image be detected. It has been customary to detect the center of an image by using a photointerrupter or similar photosensor responsive to the angle of the mirror or by fixing the start position of the mirror.

However, the problem with the above conventional schemes is that the angular error of the mirror is too great to detect the center with accuracy. This prevents the barrel-like distotion particular to the image sensor to be corrected.

Technologies relating to the present invention are also disclosed in, e.g., Japanese Patent Laid-Open Publication Nos. 61-9074, 61-229174, 64-48120, 3-150521, 4-167861, 5-7280, 5-40843, and 9-21970.

SUMMARY OF THE INVENTION

It is therefore an object of the present invention to provide an image scanner capable of accurately detecting the center of a valid image reading range and thereby allowing the distortion of an image to be corrected.

In accordance with the present invention, an image scanner capable of detecting the center of the image of a document includes a reading section including a linear CCD image sensor, a lens, a mirror for scanning the document in the subscanning direction, and a mechanism for rotating the mirror. A post supports the reading section such that the reading section is positioned several ten centimeters above the document. The post is supported by a base. A center mark is positioned outside of a valid image reading range in parallel to the axis of rotation of the mirror for accurately detecting the center position of the mirror. The center mark is input together with the image of the document.

Also, in accordance with the present invention, a method of detecting the center of the image of a document by use of an image scanner begins with the step of returning, after the power-up of the image scanner, a mirror included in a reading section to a physical read start position. A linear CCD image sensor is caused to to read one line for thereby starting the detection of a center mark positioned outside of a valid image reading range in parallel to the axis of rotation of the mirror. Whether or not the center mark is present on the one line incident to the linear CCD image sensor is determined. When the center mark is detected, a reading range is calculated by using the center mark as a center. The mirror is returned toward the read start position by a number of lines between the read start position and a position where the center mark is detected, whereby the read start position is determined.

BRIEF DESCRIPTION OF THE DRAWINGS

The above and other object, features and advantages of the present invention will become apparent from the following detailed description taken with the accompanying drawings in which:

FIG. 3 is a flowchart demonstrating a specific operation of the illustrative embodiment.

DESCRIPTION OF THE PREFERRED EMBODIMENTS

Figure 1:
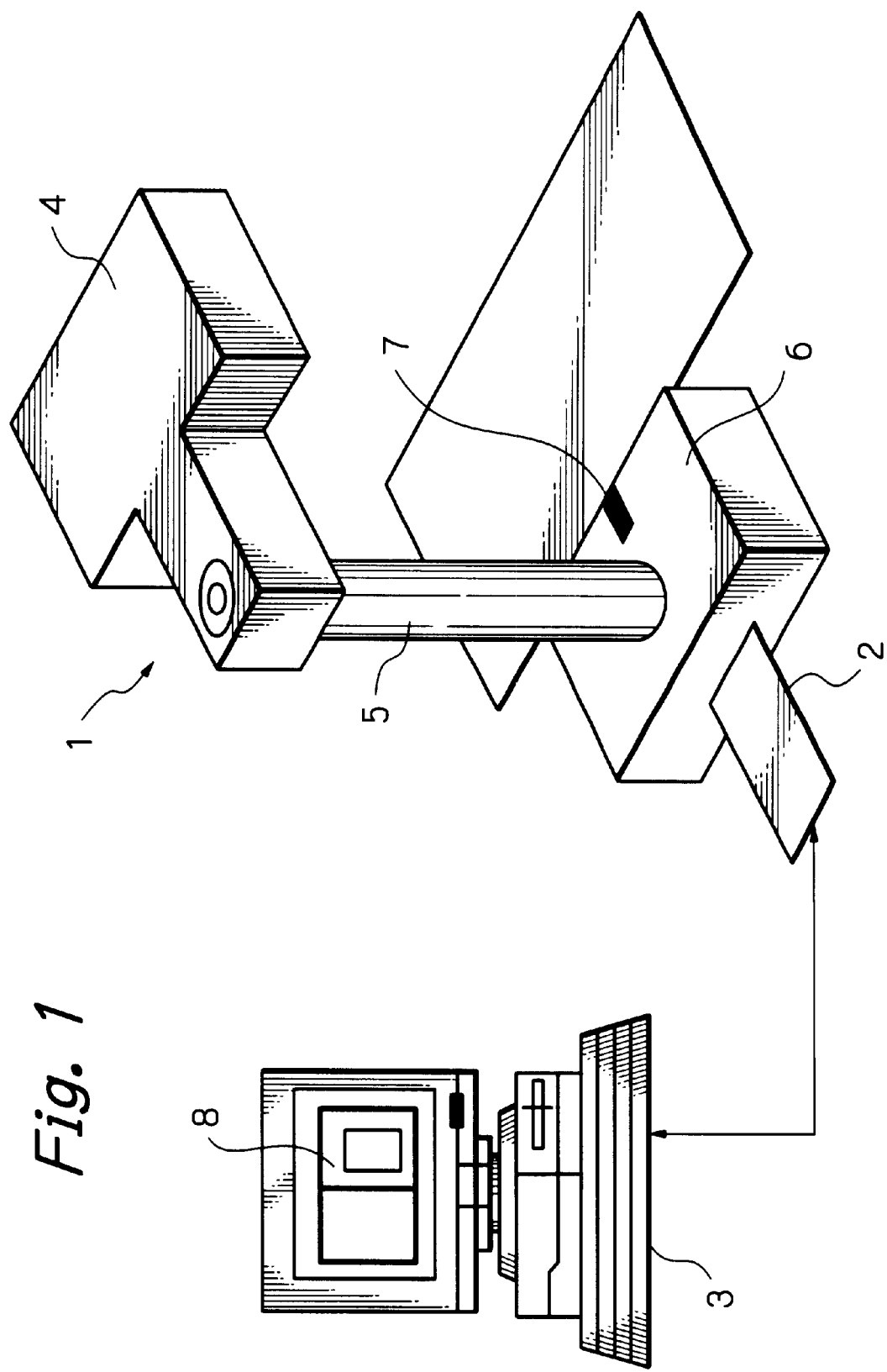
FIG. 1 shows the general construction of a stand type image scanner embodying the present invention.
Figure 2:
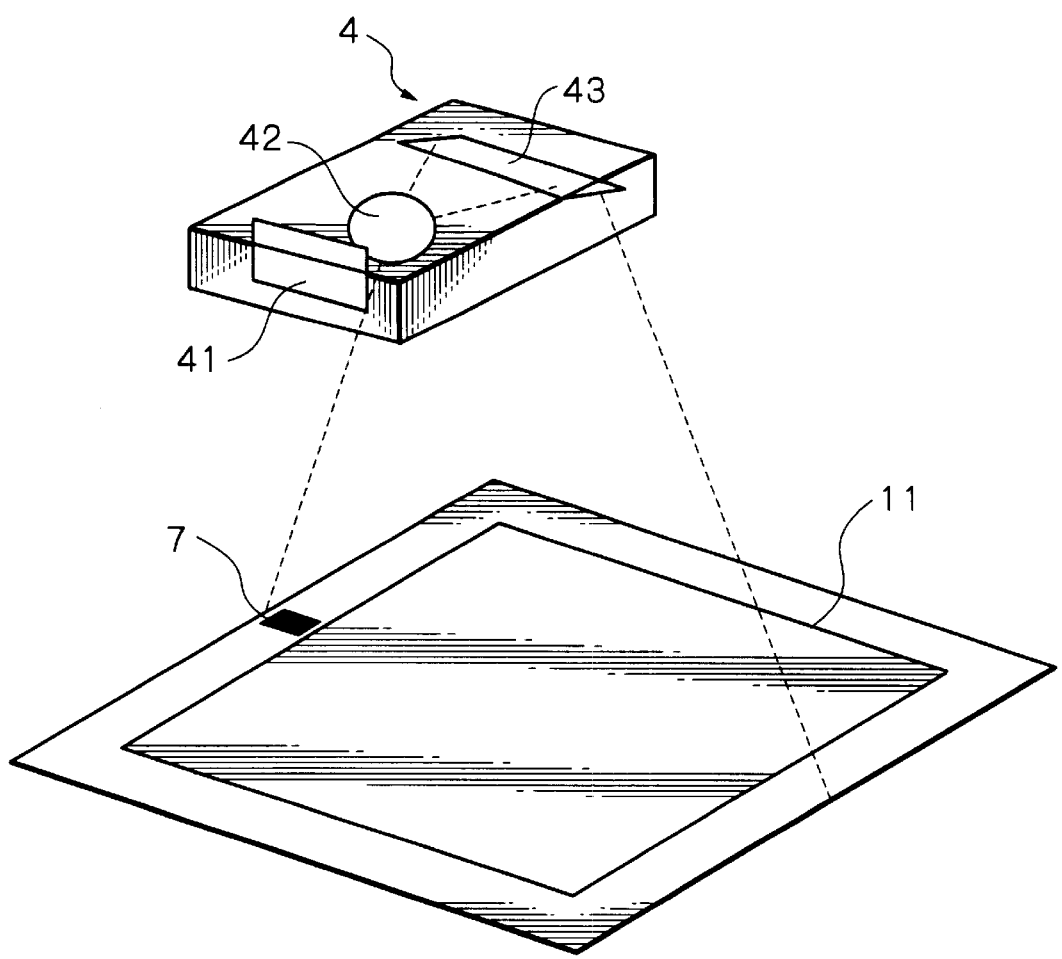
FIG. 2 shows a scanning section included in the illustrative embodiment specifically.

Referring to FIGS. 1 and 2, an image scanner embodying the present invention and free from the problem discussed earlier is shown. As shown, the image scanner, generally 1, is of stand type and generally made up of a reading section 4, a post 5 supporting the reading section 4, and a base 6 supporting the post 5. The reading section 4 includes a linear CCD image sensor 41, a lens 42, and a mirror 43 including a subscan rotation mechanism. The reading section 4 is capable of reading a document positioned several ten centimeters below the section 4. A host 3 for controlling the image scanner 1 is connected to the scanner 1 via an interface 2. The host 3 sends a command to the image scanner 1 via the interface 2. The image scanner 1 performs an operation indicated by the command and sends an image read to the host 3. The image read by the image scanner 1 appears on a screen 8 included in the host 3.

As shown in FIG. 2, in the reading section 4, an imagewise reflection from a document is reflected by the mirror 43 and then incident to the image sensor 41 via the lens 42. The image sensor 41 transforms the incident light to a corresponding analog electric signal. An analog-to-digital converter, not shown, converts the analog electric signal to corresponding digital data, i.e., one line of image data. As for the main scanning direction, the image sensor 41 is capable of reading a preselected range. As for the subscanning direction, the image sensor 41 is capable of reading a preselected range with the mirror 43 being rotated. In this manner, the image sensor 41 is capable of reading bidimensional image data. A center mark 7 is provided on the base 6 outside of a valid image reading range 11, but at the center of the same range 11.

Reference will also be made to FIG. 3 for describing a procedure beginning with the power-up of the image scanner 1 and ending with the detection of a center. On the power-up of the image scanner 1 (step S31), the mirror 43 of the reading section 4 is returned to its physical read start position (step S32), Then, to start detecting the center mark (step S33), the image sensor 41 reads one line (step S34). Whether or not the center mark 7 is present on one line read by the image sensor 41 is determined (step S35). If the answer of the step S35 is positive (Yes), then a reading range is calculated by use of the position of the center mark 7 as a center (step S36); if otherwise (No, step S35), then the program returns to the step S34. Thereafter, the mirror 43 is returned toward a physical read start position by a number of lines between the read start position and the position where the center mark 7 has been detected (step S37). This is the end of the detection of the center mark (step S38).

Figure 4A:
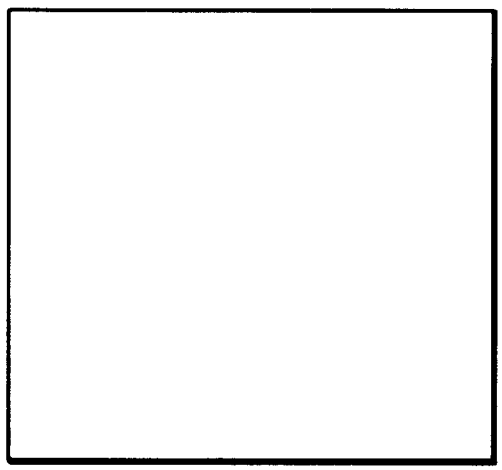
FIGS. 4A–4C show how the barrel-Like distortion of an image ascribable to the illustrative embodiment is corrected.
Figure 4B:
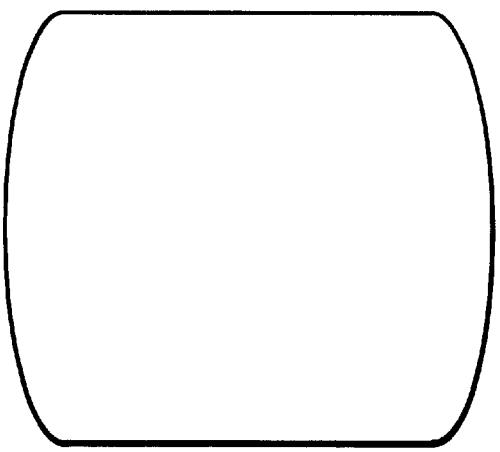
Figure 4C:
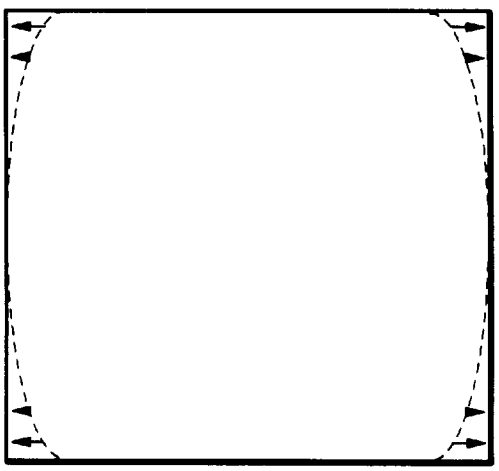

To actually read image data, the host 3 sends a read command to the image scanner 1 via the interface 2. In response, the reading section 4 sends digital data representative of a document image to the host 3 via the interface 2. Because an imagewise reflection from the mirror 43 is incident to the image sensor 41, the distance between the image sensor 41 and the document is greater at the read start position and read end position than at the center. As a result, the image data read by the including section 4 at the read start position and read end position are reduced in size than the actual image. Consequently, the original image shown in FIG. 4A is distorted in a barrel configuration as shown in FIG. 4B. The host 3 therefore corrects the barrel-like distortion, as shown in FIG. 4C, and displays the corrected image on the screen 8.

In the illustrative embodiment, the image scanner 1 detects the center position alone, as stated above. Alternatively, the host 3 may analyze the image data read by the image scanner 1 so as to detect the center position.

As stated above, the illustrative embodiment has the center mark 7 located at a position parallel to the axis of rotation of the mirror 43 included in the reading section 4 above the base 6. At the time of image reading, the reading section 4 reads an image including the center mark 7 and can therefore reset a read start position by using the center 7 mark as a center. This successfully reduces the positional error of the mirror 43 and thereby accurately determines a reading range and accurately corrects the barrel-like distortion of an image.

In summary, it will be seen that the present invention provides an image scanner allowing the barrel-like distortion of an image to be accurately corrected by detecting a center with accuracy. This can be done because a center mark is located at a fixed position.

Various modifications will become possible for those skilled in the art after receiving the teachings of the present disclosure without departing from the scope thereof.

What is claimed is:

1. An image scanner capable of detecting a center of an image of a document in a subscanning direction, comprising:

a reading section including a linear CCD image sensor, a lens, a mirror for scanning the document in the subscanning direction, and a mechanism for rotating said mirror;

a post supporting said reading section such that said reading section is positioned at a predetermined distance above the document;

a base supporting said post; and a center mark positioned outside of a valid image reading range in parallel to an axis of rotation of said mirror for accurately detecting when said mirror has scanned a center position of the valid image reading range in the subscanning direction, said center mark being input together with the image of the document.

2. A method of detecting a center of an image of a document in a subscanning direction by use of an image scanner, comprising the steps of:

returning, after power-up of said image scanner, a mirror included in a reading section to a physical read start position;

causing a linear CCD image sensor to read one line for thereby starting a detection of a center mark positioned outside of a valid image reading range in parallel to an axis of rotation of said mirror;

determining whether or not said center mark is present on the one line incident to said linear CCD image sensor;

calculating, when said center mark is detected, a reading range in a subscanning direction by using said center mark as a center; and returning said mirror toward the read start position by a number of lines between said read start position and a position where said center mark is detected, whereby said read start position is determined.

3. The image scanner as recited in claim 1, wherein said center mark is disposed on said base and wherein said valid image reading range is disposed on a surface separate from said base.

\* \* \* \* \*